United States Patent [19]

Morinaga

[11] 4,202,550
[45] May 13, 1980

[54] STEREO LEAD WIRES AND ARRANGEMENTS THEREOF FOR CONNECTING PICK-UP DEVICE TO AMPLIFIER

[75] Inventor: Mitsuyoshi Morinaga, Tokyo, Japan

[73] Assignee: Trio Kabushiki Kaisha, Tokyo, Japan

[21] Appl. No.: 896,040

[22] Filed: Apr. 13, 1978

[30] Foreign Application Priority Data

Apr. 20, 1977 [JP] Japan .............................. 52-50054[U]
Apr. 20, 1977 [JP] Japan .............................. 52-50055[U]

[51] Int. Cl.² ............................................... G11B 3/10
[52] U.S. Cl. .............................. 274/23 R; 174/117 F; 174/115
[58] Field of Search ............. 174/117 F, 117 FF, 115; 274/23 R, 37, 1 R; 179/100.4 R, 100.4 ST

[56] References Cited

U.S. PATENT DOCUMENTS

| | | | |
|---|---|---|---|
| 2,660,437 | 11/1953 | Harman | 274/23 R |
| 3,167,317 | 1/1965 | Wilson | 274/23 R |
| 3,459,879 | 8/1969 | Gerpheide | 174/117 FF |
| 3,735,022 | 5/1973 | Estep | 174/117 F |
| 3,815,054 | 6/1974 | McClure et al. | 174/115 |
| 3,966,216 | 6/1976 | Sandoval | 274/37 |

FOREIGN PATENT DOCUMENTS 1205232  9/1970  United Kingdom ..................... 274/37

*Primary Examiner*—John W. Shepperd
*Attorney, Agent, or Firm*—Gerald J. Ferguson, Jr.; Joseph J. Baker

[57] ABSTRACT

Improved lead wires for use with a stereo record playback system where at least a pair of left channel wires and at least a pair of right channel wires extend from a pick-up device through a tone arm to a stereo amplifier, the lead wires including a ground wire and the left and right channel wires, the ground wire being disposed between the left channel wires and the right channel wires to provide electrical isolation therebetween and the ground wire and left and right channel wires being bonded together as a single unit so that the electrical isolation is implemented within the tone arm without the addition of undue weight to the arm. The right channel wires may be twisted together as may the left channel wires. The ground wire and left and right ground wires may all be separated and unbonded from one another at least at the area of the pivot of the tone arm to facilitate rotation thereof.

6 Claims, 7 Drawing Figures

STEREO LEAD WIRES AND ARRANGEMENTS THEREOF FOR CONNECTING PICK-UP DEVICE TO AMPLIFIER

BACKGROUND OF THE INVENTION

This invention relates to lead wires for use with stereo pick-up devices and tone arms and in particular to lead wires and arrangements thereof for connecting the pick-up device to the stereo amplifier.

Conventionally the pick-up for a stereo record playback system simply has the lead wires randomly passing through the tubular tone arm to lead the outpt signal from the pick-up cartridge to the amplifier. Referring to FIG. 1 for this, 1 is a tubular tone arm, 2 is an arm holder, 3 is a balance weight, and 4 is an arm support, which comprises a slide pipe 5, rotor shaft 6, and bearings 7. 8 is the connector for the cartridge, 9 is a terminal connection to the amplifier, and 10 generally indicates lead wires. Lead wires 10 extend from connector 8 through arm 1, are turned at 12 in the direction of support 4, and are directed to terminal 9 through support 4. In FIG. 2, L+ stands for left channel positive, L— for negative, R+ for the right channel positive, and R— for negative, the channels being wired separately. The distance from connector 8 to terminal 9 is usually as long as 30 cm. Consequently, the crosstalk characteristic between the left and right channels deteriorates at higher frequencies due to mutual interference.

In order to prevent the mutual interference, some arms are designed so that the pipe of the arm is divided in the axial direction into two chambers with a separating plate for shielding, the lead wires for each channel being passed through the respective chambers. And, in another, spacers are inserted so that the lead wires in the pipe are kept apart. However, in these cases, the arm becomes heavy, which is likely to have an undesirable effect on the rotating motion of the arm.

In order to eliminate the above-mentioned shortcomings, tone arm lead wires that are formed into one by alternately abutting the positive side lead wires and the negative side lead wires are described in Japanese Utility Model Publicatiion No. Sho-50 128002 and it has been stated that crosstalk characteristics were improved.

SUMMARY OF THE INVENTION

A primary object of this invention is to provide improved lead wires for a tone arm which improve crosstalk without any additional work or structural insertions in the tone arm itself and which also eliminates the influence between the left and right channels.

It is a further important object of this invention to provide improved lead wires of the foregoing type which are bound together with a ground wire which is disposed between the positive and negative lead wires for the left channel and the positive and negative lead wires for the right channel.

It is a further object of this invention to provide improved lead wires of the foregoing type where the lead wires are preferably separated from one another where they turn from the tone arm to the arm support.

It is a further object of this invention to provide improved lead wires of the foregoing type where the foregoing ground wire is preferably not grounded at the point where the lead wires connect to the pick-up device.

Other objects and advantages of this invention will be apparent from a reading of the following specification and claims taken with the drawing.

DETAILED DESCRIPTION OF PREFERRED EMBODIMENTS

Figure 1:
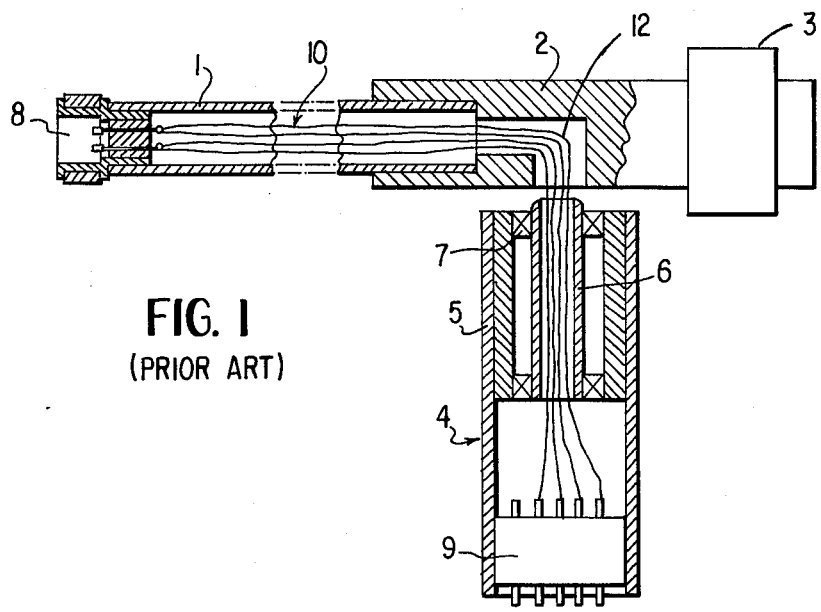
FIG. 1 is a cross-section of an illustrative, prior art pick-up system indicating the wiring of the conventional lead wires.
Figure 2:
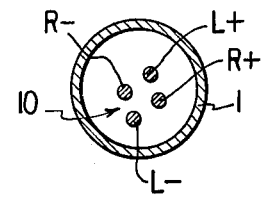
FIG. 2 is a cross-section of the tone arm of FIG. 1.

Reference should be made to the drawing where like reference numerals refer to like parts.

Figure 3:
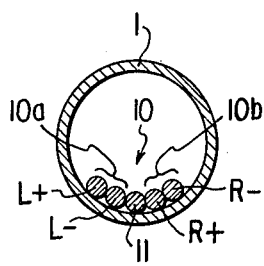
FIGS. 3–5 are cross-sectional views of various illustrative embodiments of this invention.

In FIG. 3 the lead wires 10 extending through tone arm 1 comprise left channel lead wires 10a and right channel lead wires 10b. The left channel lead wires 10a are indicated as positive side lead wire L+ and negative side lead wire L—. Right channel lead wires 10b are indicated as positive side lead wire R+ and negative side lead wire R—. A ground wire 11 is placed between the left channel lead wires 10a and the right channel lead wires 10b, and they are bonded into one. Consequently, when there are four lead wires, they form a band as shown in FIG. 3. The order of arrangement can be either L+, L—, ground wire 11, R+, and R— from the left, or L+, L—, ground wire 11, R—, and R+, from the left. In other words, because of the presence of ground wire 11 between the left and right channel lead wires 10a and 10b, a space is maintained between the two, and since they are also grounded, there is no electrostatic induction, and crosstalk is markedly improved.

Figure 4:
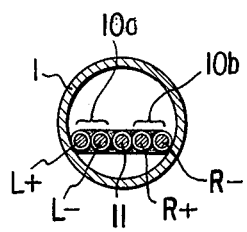
Figure 5:
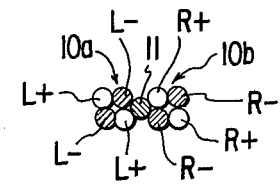

FIG. 5 illustrates a further embodiment where there is a plurality of both the positive side and the negative side of the lead wires 10a and 10b. Left and right channel lead wires 10a and 10b as well as ground wire 11 disposed therebetween are bonded as in the FIGS. 3 and 4 embodiments to thereby provide rigidity. Accordingly, as will be described below with respect to FIG. 7, it is desirable to separate the wires at turn 12 of the wires, which is disposed at the pivot area of the arm.

Because the tone arm lead wires of this invention are formed as one with the ground wire between (a) the left channel lead wires, where the positive side lead wires and the negative side lead wires are in parallel, and (b) the similarly arranged right channel lead wires, their insertion into the tone arm or other assembling work is easy. Moreover, there is no great increase in tone arm weight. Also a space between the left and right channel lead wires is maintained by the ground wire. Further, since they are also grounded there is no electrostatic induction and crosstalk elimination is substantially improved.

Figure 6:
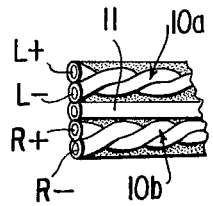
FIG. 6 is a partial plan view of illustrative lead wires in accordance with the present invention.

In FIG. 6, the left and right channel lead wires 10a and 10b are twisted although they may be straight as shown in FIG. 4. Further, the FIG. 5 embodiment may also be twisted.

Figure 7:
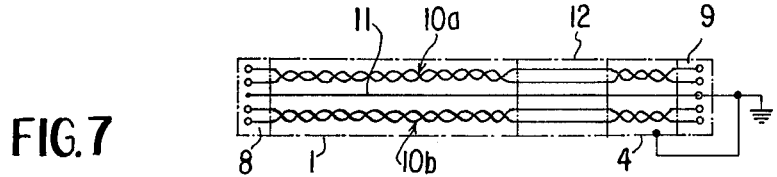
FIG. 7 is a schematic diagram indicating how the lead wires may be arranged in the playback system in accordance with the invention.

FIG. 7 is a schematic drawing of the lead wires of the present invention corresponding to the FIG. 1 wiring.

At turn 12, the twisting of the above lead wires and the binding with the ground wire are preferably undone, and the lead wires and the ground wire are separated. By doing so, the rotating motion of the arm is free and unaffected by the rigidity of the wire parts and the arm can make a smooth rotating motion whereas if the wires were not separated at turn 12, rotation of arm 1 would tend to be inhibited. The degree of separation allowed at turn 12 is such that it does not interfere with the crosstalk improvement.

Ground wire 11 is left open on connector 8 side and not grounded. Consequently, even if the arm material has a large conductive resistance, there is no risk of forming a closed circuit, this not being the case if ground wire 11 were grounded to arm 1 inasmuch as a closed circuit would result which is sometimes disadvantageous.

When the pick-up lead wires of the foregoing embodiments are used, even in the case of using those where the left channel positive and negative lead wires and the right channel positive and negative lead wires are bound together with the ground wire in between, they do not interfere with the rotating motion of the arm at all, but smooth rotation is possible. In addition, since the ground wire on the connector side is left open, it can be grounded accurately without being affected by the material of the arm and is effective in improving crosstalk characteristics.

What is claimed is:

1. Improved lead wires for use with a stereo record playback system where at least a pair of left channel wires and at least a pair of right channel wires extend from a connector for pick-up device through an electrically conductive tone arm to a stereo amplifier, said lead wires comprising a ground wire and said left and right channel wires, said ground wire being disposed between said left channel wires and said right channel wires to provide electrical isolation therebetween, said ground wire and left and right channel wires being bonded together at least in a portion of said tone arm as a single unit so that said electrical isolation is implemented at least within said tone arm without the addition of undue weight to the arm and said ground wire being grounded to said tone arm at the stereo amplifier end thereof and spaced from said tone arm at the connector end thereof to thereby establish an open circuit between said ground wire and said tone arm at said connector end thereof.

2. Lead wires as in claim 1 where said ground wire and left and right channel wires are disposed in the same plane.

3. Lead wires as in claim 1 where said right channel wires are twisted together and said left channel wires are also twisted together.

4. Lead wires as in claim 1 where said right and left channel wires and said ground wire are straight.

5. Lead wires as in claim 1 including at least four right channel wires and at least four left channel wires.

6. Lead wires as in claim 1 where said ground wire and left and right ground wires are all separated and unbonded from one another at least at the area of the pivot of said tone arm to facilitate rotation thereof.

* * * * *